United States Patent

Stamos et al.

[11] Patent Number: 6,058,401
[45] Date of Patent: May 2, 2000

[54] METHOD FOR DATA REPLICATION WITH CONFLICT DETECTION

[75] Inventors: James Stamos, San Jose; Benny Souder, Belmont; Lip Boon Doo, San Jose; Alan Downing, Fremont, all of Calif.

[73] Assignee: Oracle Corporation, Redwood Shores, Calif.

[21] Appl. No.: 09/081,297

[22] Filed: May 20, 1998

Related U.S. Application Data

[63] Continuation-in-part of application No. 08/618,507, Mar. 19, 1996.

[51] Int. Cl.[7] ........................................... G06F 17/30
[52] U.S. Cl. ........................ 707/201; 707/203; 707/10
[58] Field of Search ............................. 701/201, 8, 102, 701/203, 2, 3, 10

[56] References Cited

U.S. PATENT DOCUMENTS

| | | | |
|---|---|---|---|
| 5,737,601 | 4/1998 | Jain et al. | 707/201 |
| 5,806,075 | 9/1998 | Jain et al. | 707/201 |
| 5,870,759 | 2/1999 | Bauer et al. | 707/201 |
| 5,870,765 | 2/1999 | Bauer et al. | 707/203 |
| 5,884,325 | 3/1999 | Bauer et al. | 707/201 |
| 5,926,816 | 7/1999 | Bauer et al. | 707/201 |

*Primary Examiner*—Jean R. Homere
*Attorney, Agent, or Firm*—McDermott, Will & Emery

[57] ABSTRACT

Communication costs are reduced in a distributed system that supports data replication with conflict detection by sending small values or nulls as replacements for field values that are not strictly used for replication or conflict detection. Specifically, nulls are propagated for new values of unmodified fields, old values of fields in unmodified groups of linked fields, and old values of fields for which conflict detection has been disabled. Flag values that indicate which actual old and new values were sent may be generated and propagated along with the replicated data.

45 Claims, 7 Drawing Sheets

METHOD FOR DATA REPLICATION WITH CONFLICT DETECTION

RELATED APPLICATION

This Application is a continuation-in-part of the commonly assigned, U.S. application Ser. No. 08/618,507 entitled "Configurable Conflict Resolution in a Computer Implemented Distributed Database," filed on Mar. 19, 1996 by Benny Souder, Lip Boon Doo, and Alan Downing, the contents of which are incorporated by reference herein.

FIELD OF THE INVENTION

The present invention relates to database systems and more particularly to techniques for propagating changes from one site to another.

BACKGROUND OF THE INVENTION

Under certain conditions, it is desirable to store copies of a particular body of data, such as a relational database table, at multiple sites in a distributed compute network. If users are allowed to update the body of data at one site, the updates must be propagated to the copies at the other sites in order for the copies to remain consistent. The process of propagating the changes is generally referred to as replication. Various mechanisms have been developed for performing replication. Once such mechanism is described in the commonly assigned U.S. patent application Ser. No. 08/126,586 entitled "Method and Apparatus for Data Replication," filed on Sep. 24, 1993 by Sandeep Jain and Dean Daniels, now abandoned, the contents of which are incorporated herein by reference The site at which a change is initially made to a set of replicated data is referred to herein as the "source site." The sites to which the change must be propagated are referred to herein as "destination sites." If a user is allowed to make changes to copies of a particular table that is replicated at different sites, those sites are sources sites with respect to the changes initially made to their own copy of the table and destination sites with respect to the changes initially made to copies of the table at other sites. Replication does not require an entire transaction executed at a source site to be re-executed at each of the destination sites. Only the changes made by the transaction need to be propagated. Other types of operations, such as read and sort operations, that may have been executed in the original transaction do not have to be re-executed at the destination sites.

There are two basic approaches to replication: synchronous replication and asynchronous replication. In synchronous replication, each update or modification of a body of data is immediately replicated to all other replicas or copies of the body of data within the distributed network, typically by techniques such as a two-phase commit. The transaction that modifies the body of data is not allowed to complete until all other replicas have been similarly updated. Although synchronous replication provides a straightforward methodology for maintaining data consistency in a network this method is susceptible to network latencies and intermittent network failures. Furthermore, synchronous replication cannot prioritize updates; accordingly, low priority updates can unnecessarily produce significant system delays.

On the other hand, in asynchronous replication, local replicas of a particular data structure are allowed to be slightly different for a time until an asynchronous update is performed. During asynchronous replication, a distributed node can modify its local copy of a data structure without forcing a network access as in synchronous replication methodology. At some later point time in time, the modification is propagated to the destination sites. Various techniques for asynchronous propagation have been developed for example, remote procedure calls (RPCs) and deferred transaction queues.

In asynchronous replication, conflicts in updating a body of data might occur if two sites concurrently modify the same data item before the data modification can be propagated to other sites. If update conflicts are not first detected and then handled in some convergent manner, the data integrity of the replicated copies will begin to diverge. FIG. 3 illustrates a typical update conflict scenario. Site A 310 and site B 320 are shown having copy 312 and copy 322, respectively, of a replicated table called "emp." In this example, the "emp" table is a body of data that stores information about employees and is organized into rows and columns. The columns of table "emp" record attributes about each employee, such as an employee number ("empno"). the name of the employee ("ename"), a commission figure ("comm"), and an accrued bonus level ("bonus"). The rows of table "emp" refer to individual employees, for example, employee number 100 is named Jones, has a commission figure of $20, and accrued a bonus of level zero.

At site A 310, an update request 314 is processed to increase Jones' commission by $75, resulting in local table 316. Concurrently, however, another update request 324 is processed at site B 320 to increase Jones' commission by $280, resulting in local table 326. In FIG. 3, the particular update requests 314 and 324 are illustrated by a SQL (structured query language) statement. Modification information 318, comprising old and new values from site A 310, is propagated to site B 320 via replication mechanism 330. In this example, the old values for employee number 100 are the name of "Jones," a commission of $20 and a bonus level of zero, and the new values for employee number 100 are the name "Jones," a commission of $95, and a bonus level of zero. A conflict detection mechanism 332 at site B 320 receives the old and new values and checks for a conflict by comparing the propagated old values and the current values for the row 328. Since the current value for the commission for employee number 100 is $300 at site B 320, but the old value for the commission for employee 100 is $20, propagated from site A 310, the conflict detection mechanism 332 is able to detect a conflict. When a conflict is detected, one or more appropriate conflict resolution routines may be applied until the conflict is handled as described in detail in the commonly assigned U.S. application Ser. No. 08/618, 507.

Therefore, conflicts can be detected by comparing a current value for a column or attribute at a destination site with a propagated old value from another site. Thus, the data conflict mechanisms at destination sites need to know the new value that was propagated from the source site, the old value at the source site, and the current value at the destination site. One disadvantage with conventional approaches to asynchronous replication with conflict detection is an excessive amount of data that is transmitted from one site to another site in the network. Propagating the old and new values impose an overhead in transmitting changes over the network and in temporary storage, especially if the data size of the old and new values is large.

SUMMARY OF THE INVENTION

There exists a need for reducing overhead in data replication in a distributed system capable of detecting conflicts in replicated data. There is a need for reducing the size of data items that are transmitted over a network in data replication. There is also a need to avoid the transmission of data items not necessary for replication or conflict detection.

These and other needs are met by the present invention in which fields (e.g. table columns or object attributes) unnecessary for data replication or conflict detection are not propagated. For example, small values, such as a null, are propagated instead of new values of unmodified fields, old values of fields unrelated to modified fields, and old values of user selected fields. Consequently, network and storage overhead is reduced because small values are propagated instead of larger field values.

One aspect of the invention is a method for maintaining multiple copies of a body of data such as table organized into rows and columns. In response to determining whether a record (such as a row within the body of data) is updated at a first site, small values such as nulls are propagated to a second site for at least one of the old values and/or the new values of the updated record, thereby reducing the amount of data transmitted. The existence of a conflict at the second site is determined based on the propagated small values and propagated actual old values, and, if the conflict does not exist, the corresponding record is updated based on the propagated small values and propagated actual old and new values.

Another aspect of the invention is a computer-implemented method and a computer-readable medium bearing an arrangement of instructions for maintaining multiple copies of a body of data such as table organized into rows and columns. A request is processed to perform an update to a row or record within a first copy of the body of data at a first site, and unmodified fields or updated fields are identified among those related columns or fields of the record. The update is propagated to a second site storing a second copy of the body of data and capable of detecting conflicts by: (a) propagating actual old values of at least one of the related fields; (b) propagating nulls or small values as new values for the unmodified fields, and (c) propagating actual new values of the updated fields as new values for the updated fields.

Yet another aspect of the invention is a computer-implemented method and a computer-readable medium bearing an arrangement of instructions for maintaining multiple copies of a body of data organized into records, partitioned into groups of related fields. A request is processed to perform an update to a row or record within a first copy of the body of data at a first site, and unmodified field groups or updated field groups are identified among those groups of fields. The update is propagated to a second site storing a second copy of the body of data and capable of detecting conflicts by: (a) propagating actual old values of at least one field in an updated group as old values, (b) propagating nulls or small values as old values for fields in an unmodified group, (c) propagating actual new values of one or more fields in an updated group as new values, and (d) propagating nulls or small values as new values for the fields in an unmodified group.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for maintaining multiple copies of a body of data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE AND NETWORK OVERVIEW

Figure 1:
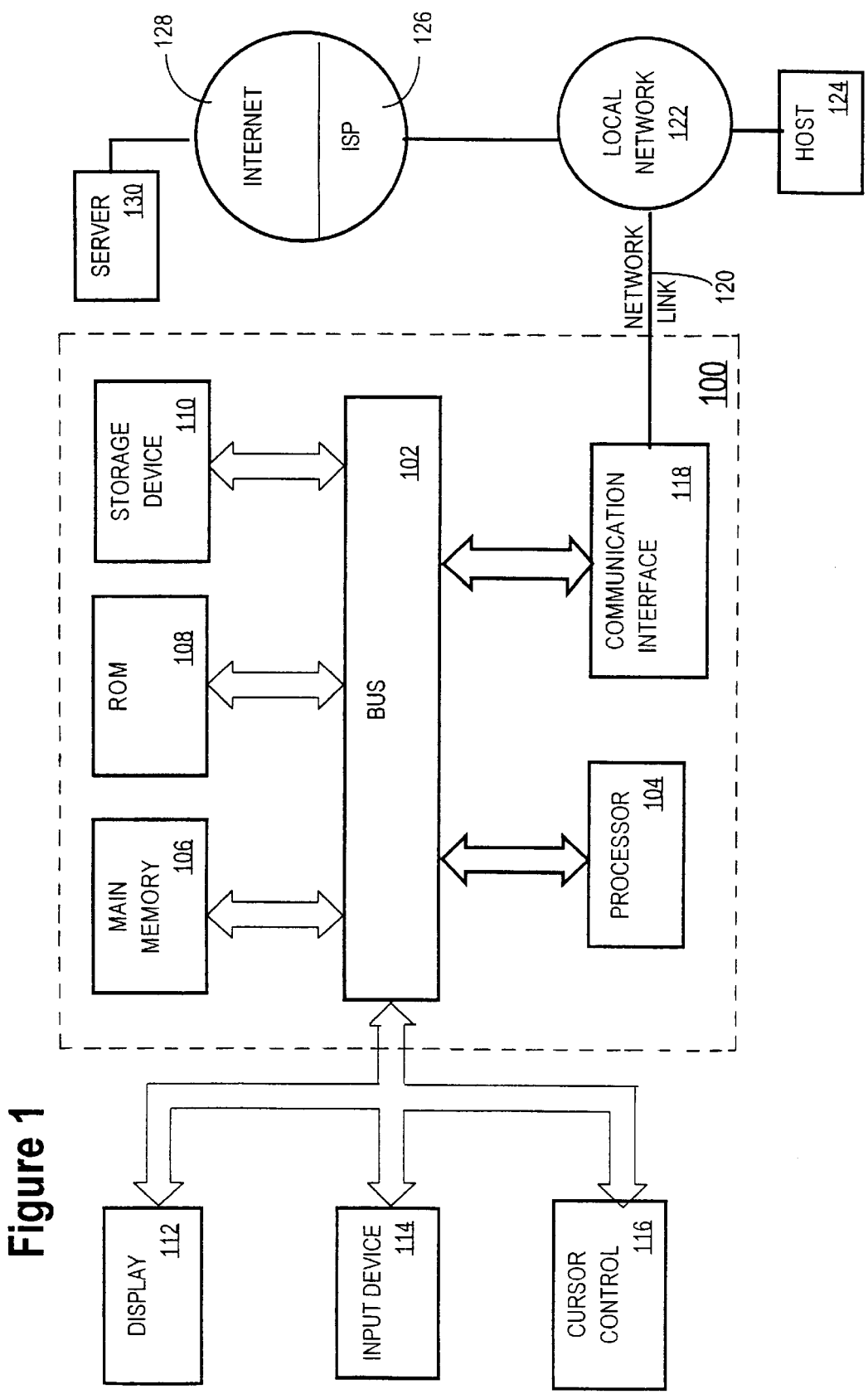
FIG. 1 depicts a computer system than can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for maintaining multiple copies of a body of data maintaining multiple copies of a body of data. According to one embodiment of the invention, maintaining multiple copies of a body of data is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for maintaining multiple copies of a body of data as described herein. The received code may be executed by processor 104 as it is received, and/or stored in storage device 110, or other non-volatile storage for later execution. In this manner, computer system 100 may obtain application code in the form of a carrier wave.

Figure 2:
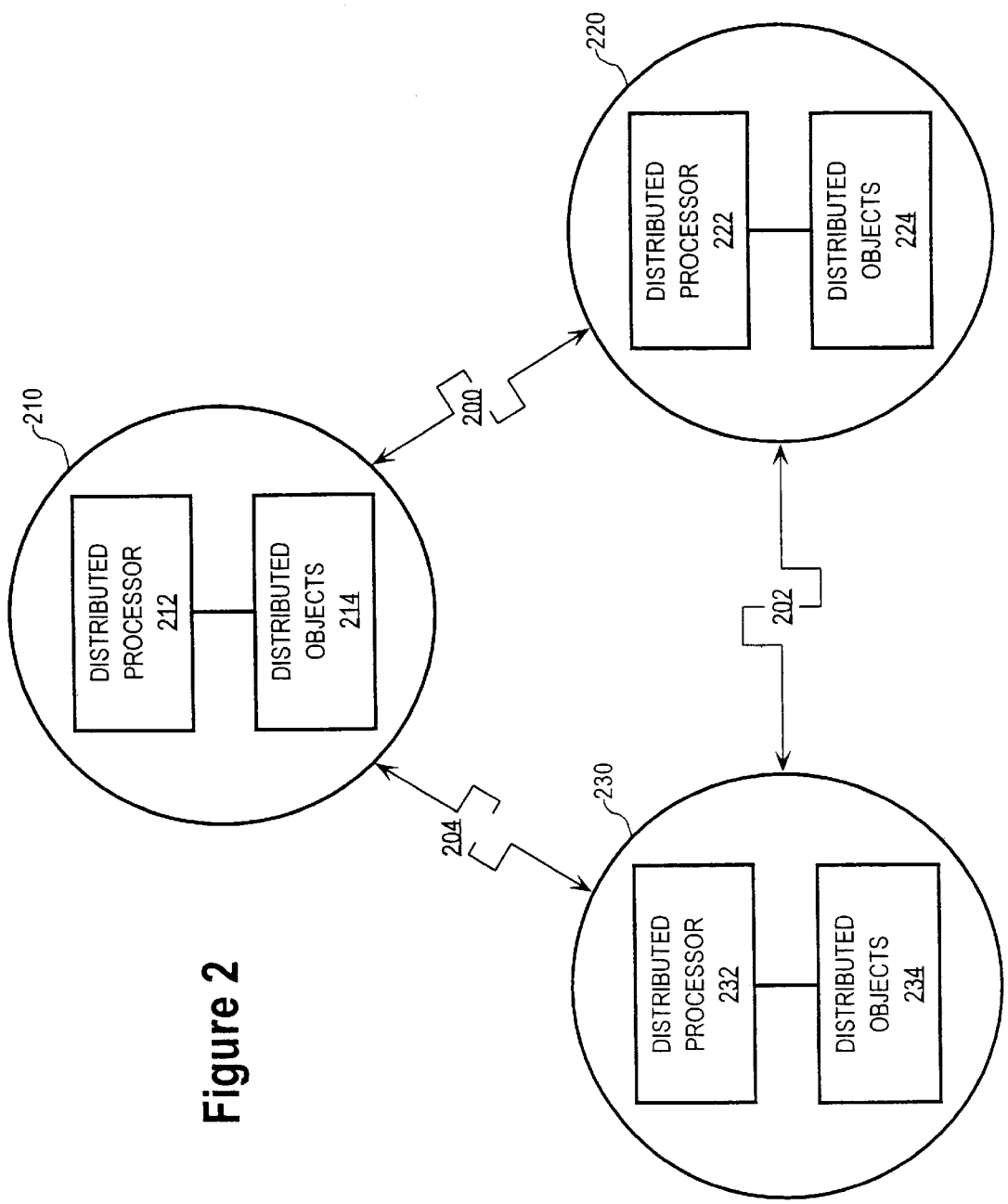
FIG. 2 depicts a distributed system upon which the present invention can be implemented.

FIG. 2 illustrates a distributed data processing system comprising nodes 210, 220, and 230 coupled to one another with network links 200, 202, and 204. Although three nodes 210, 220, and 230 and three network links 200, 202, and 204 are shown in FIG. 2, it is to be understood that an arbitrary number of nodes in the distributed data processing system may be supported in an arbitrary configuration. Referring back to FIG. 1, the network links 200, 202, and 204 can be a link 120 to a local area network 122 or, ultimately, to the Internet 128. Each node, such as node 210, comprises a distributed processor 212 and distributed objects 214 stored a distributed data store (not shown). Thus, nodes 220 and 230 comprise distributed processors 222 and 232 and distributed objects 224 and 234, respectively. The distributed data store can be main memory 106 or mass storage device 110 as shown in FIG. 1, and distributed processor 212 can be implemented as computer system 100.

Distributed objects 214 may comprise programs or other arrangements of instructions, and bodies of data or other data objects, which may be shared by or replicated to other nodes in the distributed system. Distributed processor 212 directly accesses distributed objects 214, because distributed objects 214 are local (i.e., located within the same node) to distributed processor 212. In this situation, access between distributed processor 212 and distributed objects 214 does not require a network access. Typically, local accesses are performed more quickly than accesses requiring a network communication. Other nodes (node 220 and node 230) of the distributed system illustrated in FIG. 2 access distributed objects 214 via a network access. For example, node 220 and the distributed processor 222 therein access distributed objects 214 via network link 200. The network access can be the result of a distributed transaction or a replication operation, for example.

As described above, other forms of distributed transfer technologies can cause network accesses. In a distributed transaction system, the distributed processor 222 of node 220 may record transactions as distributed objects 214 within the distributed data store of node 210. In a replication system, after a local version of the distributed objects 214 within the distributed data store of node 210 is transferred to the distributed data store 224 of node 220, the distributed processor 222 of node 220 can access a copy of distributed objects 214 locally within node 220. This local copy of the distributed objects 224 within the distributed data store of node 220 may subsequently be manipulated locally by distributed processor 220.

The hardware architecture of nodes within the distributed processing system, such as the one illustrated in FIG. 2, can be varied and diverse. There is no requirement in the present invention that each node has equivalent and compatible processing systems. It is only necessary that each node of the distributed processing system be able to communicate on a network or some communication path coupling the nodes.

SENDING NULL FIELD VALUES TO REDUCE PROPAGATION COSTS

The present invention is applicable to replication of bodies of data, in which collections of related data items, generically called "fields," are organized into records. Herein, the present invention is described generally with reference to a preferred embodiment of replicating relational database tables organized into rows and columns. A data item is located within a table at an intersection of a row, corresponding generally to a record, and a column, corresponding generally to a field. However, the present invention is applicable to other environments. For example, in an object oriented environment, an object, which belongs to an object class, corresponds generally to a record, and attributes of the object class correspond generally to fields. When a record such as a row or an object is modified in response to a request such as an SQL query or a method invocation, the value of at least one of the fields is modified. The term "actual old value" of a field refers to the value of the field prior to processing the request, and the term "actual new value" of a field refers to the value of the field subsequent to processing the request.

In order to reduce communication costs, small values, preferably "nulls," are propagated in place of values for at least some of the data items that are not strictly necessarily for data replication or conflict detection. A small value refers herein to a placeholder value that does not take up much storage for example, no more than the word size of typical processors, 32 bits (four bytes) or 16 bits (two bytes), or the size of the smallest addressable data type such as a character, typically eight bits (one byte). A null is a value that takes up no storage, that is zero bytes. Nulls, also called "empty values," may conveniently be employed in implementations in which an indication of the length of field data in the propagated modification information is sent as metadata along with the modification information. For implementations in which a field length indication is not sent along with the modification information, a small, non-zero placeholder value may be used, typically set to an arbitrary value such as zero (0) or minus one (−1).

In some embodiments of the present invention, the null or any other small, placeholder value is also a valid value for the field data. Therefore, in order to distinguish the placeholder value from the actual value, a flag value is generated and propagated as part of the modification information to indicate whether the value sent for the field is real or merely a placeholder to reduce communication costs. The flag value need only be a bit, but, for flexibility, may constitute an eight-bit byte. If, on the other hand, the placeholder value can be set to an invalid bit pattern or if null is an invalid value for the type of the field, then the presence of the placeholder versus actual data can be detected by testing the validity of the propagated value. For example, some floating-point numerical representations designate a specific bit pattern to indicate that the value is not a number (e.g., "NaN").

Consequently, propagation of a null and flag value instead of the actual field value involves the sending of a single byte in place of the actual data. For large field values, the savings are dramatic. For example, some implementations support fields that can be a string of characters up to two kilobytes (2048) or even four kilobytes (4096) in length. Thus, sending one byte instead of 4096 reduces communication costs in transmitting and buffering the data. As another example, field values can be a "large object," which is an embedded, complex data type typically produced and manipulated by another application. Examples of large objects include a word processing document, a graphical slide-show presentation, and a spreadsheet. Since large objects can be at least a gigabyte (more than a billion bytes) in size and even up to four gigabytes in size, it is evident that the present invention is particularly advantageous in replicating bodies of data wherein a data item can be a large object.

UNMODIFIED COLUMNS

As described herein above, small placeholder values, such as nulls, are propagated in place of values for at least some of the data items that are not strictly necessarily for data replication or conflict detection. Referring back to FIG. 3, the value of the ename column for employee 100 was not modified, yet the string value "Jones" was propagated as both the old value and the new value in the modification information 318. Since the new value of an unmodified column is identical to the old value of the unmodified column, one of the redundant propagated values (old or new) is replaced by a small or null placeholder value to reduce the size of the data for buffering and transmission. Upon receipt at the destination site, the placeholder value can be detected and converted back to the actual value, if needed, by inspection of the other value.

Determining whether a column or other field has been updated or unmodified can be performed statically or dynamically. Static determination of which fields have been updated and which fields are unmodified involves examining the request used to update a set of records, for example, an SQL statement to update columns of rows of a table. If the request explicitly states that a column or field is updated, then that column or field is considered an updated field. Static determination is particularly advantageous when the same request is used to update many records; thus, the analysis need only be performed once when the request is parsed or compiled, thereby amortizing the cost of static determination over many records. In some situations, especially with refreshing snapshots or other kinds of materialized views, the update request often causes a column to be updated with the same value. Although such columns have been updated, in the sense of being brought up-to-date, they remain unmodified because their values have not changed. In these situations, dynamic determination by a run-time analysis of the actual values in each changed row is advantageous because more unmodified columns can be identified for the communication costs savings.

Although either of the new value or the old value may be replaced with the small placeholder value to reduce communication costs, replacing the new value with the placeholder is particularly advantageous because it combines well with other strategies of reducing communication costs, as described hereafter.

COLUMN GROUPS

Column groups can be used to reduce communication costs in replicating data and detecting conflicts therein. A column group links a collection of columns in a table (or fields in a record) to a single "logical" column. A column group may comprise any number of columns in a table, from a single column to all the columns. Since conflict detection modules can be configured to detect conflicts on a column-group-by-column-group basis, as described in more detail in U.S. patent application Ser. No. 08/618,507, each column belongs to some column group. However, a column need not be explicitly assigned by a person to a column, because non-explicitly designated columns can automatically be assigned to a "shadow" column group, which is not visible to a user. Consequently, the explicit column groups and the shadow column group constitute a partitioning of the columns in the table.

Since each column group is individually evaluated for conflict detection and resolution, it follows that, if no column in a column group is modified, then there will be no conflict within that column group. Consequently, the sending of old column values. which are used for conflict detection but not for row identification, e.g. as primary keys, is not strictly necessary. Such old values can be replaced with a null or other small placeholder.

This communication cost reduction strategy of not sending unneeded old values in unmodified column groups can be combined with the above-described cost reduction strategy of not sending new values for unmodified columns. Since, by definition, none of the columns in an unmodified column group are modified, the new values of these columns are not strictly necessary for updating a record and, hence, are replaced by the small placeholder values. Thus, in unmodified column groups, nulls or other small placeholder values are sent instead of the actual new values and unneeded old values, resulting in a considerable savings in the amount of data transmitted and, hence, in transmission and buffering costs. In this case, flag values that indicate that both the old value and the new value are replaced by a placeholder may be propagated to the destination site as two bits within a flag byte dedicated for each column. However, since the flag value to indicate that old values are not sent is derivable from the flag value that indicates that the new values are not sent and information about which columns belong to which column groups, transmitting the flag for the old values may be omitted.

SELECTIVE DISABLING OF CONFLICT DETECTION

Another strategy for reducing communication costs is to avoid sending old values for columns or fields that (1) do not need old values for conflict resolution because the columns or fields are not modified and (2) do not need conflict detection, because, e.g., conflicts in those fields can be detected by examining an affiliated field. For example, a checksum can be calculated for a long string value in one field and stored in another. Thus, comparison of the affiliated checksum serves as a proxy for comparing the long string values. As another example, the affiliated field can contain a monotonically increasing serial number or timestamp, such as a network-wide timestamp described in U.S. patent application Ser. No. 08/808,582 entitled "Fault-Tolerant Timestamp Generation for Distributed Systems" filed on Feb. 28, 1997 by William H. Bridge, Jr., Madhusudan Krishnapuram, Jingling W. Lee, and Juan R. Loaiza, the contents of which are hereby incorporated by reference.

Accordingly, in one embodiment of the present invention, such fields can be designated as "conflict check disabled" by a user or administrator. Such designation may be stored as metadata in the database system and replicated via an administrative function to each site. When a destination site receives propagated modification information for a changed row or record, the column or field designated as "conflict check disabled" in the metadata is ignored for purposes of conflict detection. Since conflict detection is ignored for such fields, the old values need not be sent and small placeholder values such as nulls can be transmitted instead, thereby reducing communication costs.

PROPAGATING UPDATES

Figure 3:
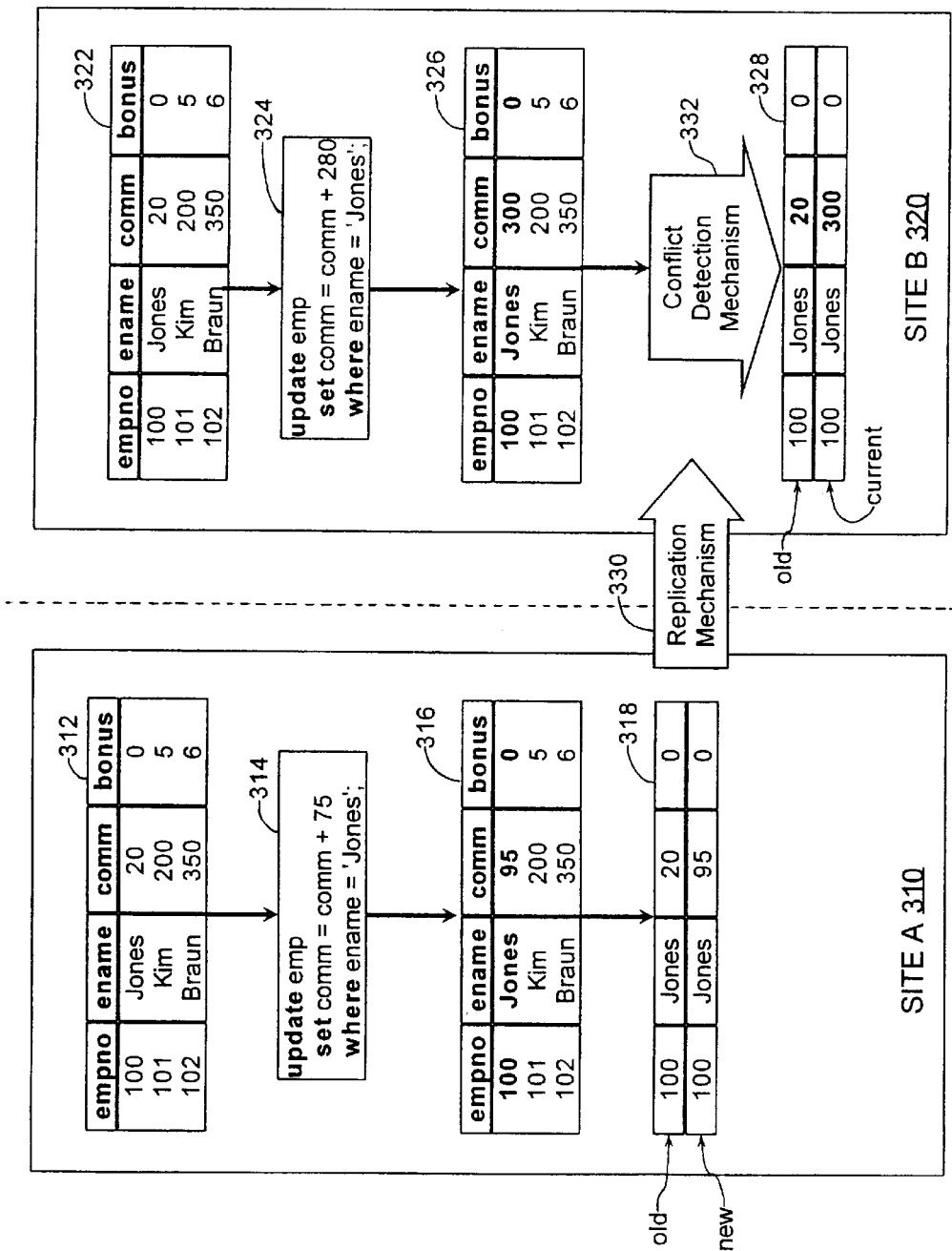
FIG. 3 is a diagram of a conventional replication and conflict detection system illustrating an update conflict scenario.
Figure 4:
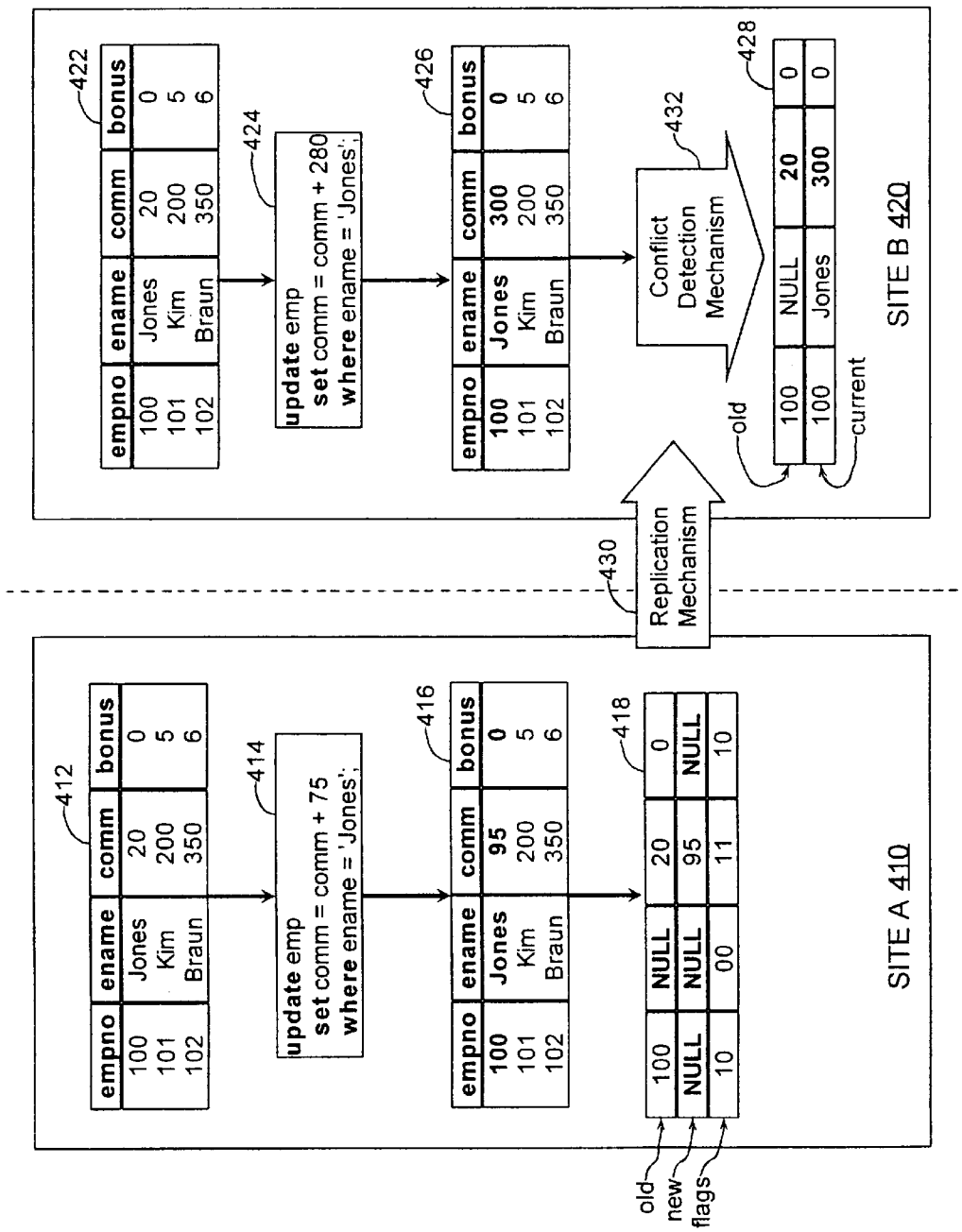
FIG. 4 is a diagram of a replication and conflict detection system according to an embodiment of the present invention illustrating the update conflict scenario.
Figure 5:
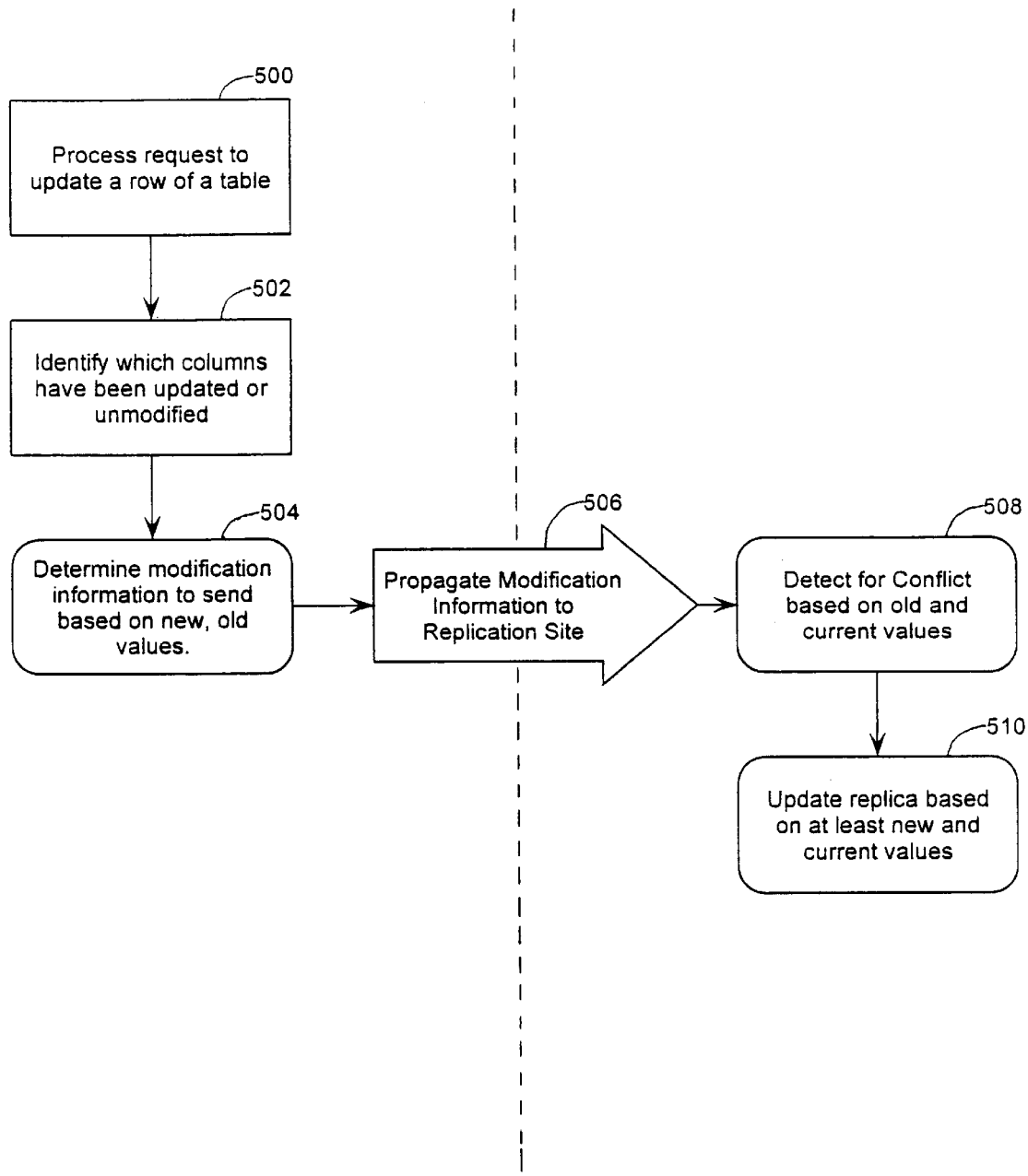
FIG. 5 is a flowchart showing the operation of replication with conflict detection according to an embodiment of the present invention.

FIG. 4 illustrates a replication and conflict scenario as handled by an embodiment of the present invention operating according to the flowchart in FIG. 5, involving the body of data replicated as described with respect to FIG. 3. Referring to FIG. 4, site A 410 and site B 420 are shown having copy 412 and copy 422, respectively, of a replicated table called "emp." In this example, the "emp" table is a body of data that stores information about employees and is organized into rows and column. The columns of table "emp" record attributes about each employee, such as an employee number ("empno"), the name of the employee ("ename"), a commission figure ("comm"), and an accrued bonus level ("bonus"). The rows of table "emp" refer to individual employees, for example, employee number 100 is named Jones, has a commission figure of $20, and accrued a bonus of level zero. Furthermore, three column groups have been designated for table "emp": a first column group containing the "empno" column, a second column group containing the "ename" column, and a third column group containing the "comm" column and the "bonus" column.

While an update request 424 at site B 420 is processed to increase Jones' commission by $280, resulting in local table 426, another update request 414 at site A 410 is concurrently processed to increase Jones' commission by $75, resulting in local table 416 (step 500). In FIG. 4, the particular update requests 314 and 324 are illustrated by a SQL update statement, for which either a parse-time or run-time analysis (step 502) indicates that the "comm" field is updated and the remaining fields are unmodified.

Figure 6:
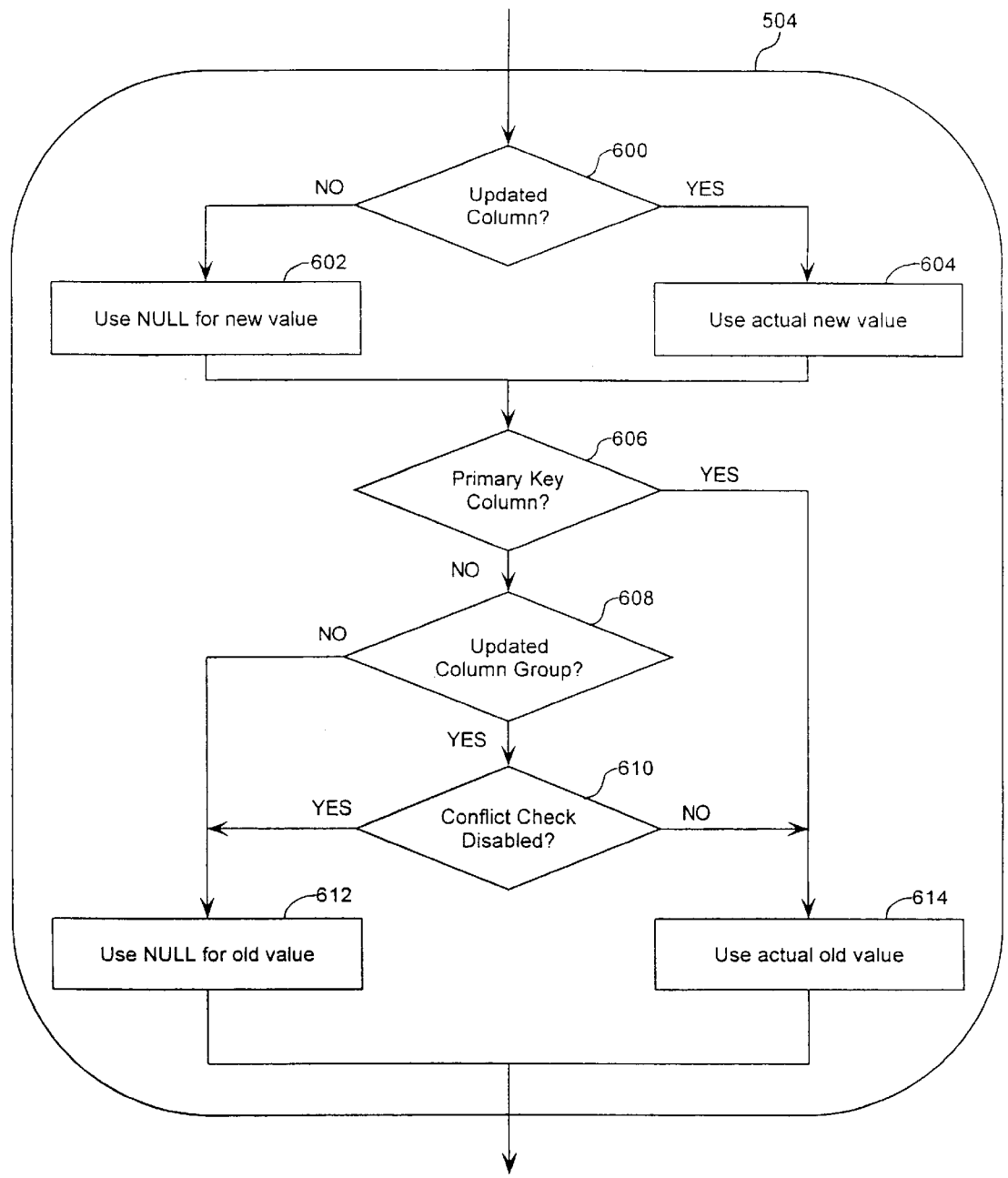
FIG. 6 is a flowchart showing the operation of a step of determining modification information to be propagated according to one embodiment.

At step 504, modification information 418 for each column is generated by the steps shown in FIG. 6. Referring to FIG. 6, at step 600 each column is checked to determine whether it is updated, by referring to the analysis performed in step 502. For the "empno," "ename," and "bonus" columns, this check indicates that the column is unmodified and execution branched to step 602, where a null is used a placeholder for the "new" value and, in appropriate embodiments, the new flag value is set. On the other hand, for the "comm" column, the check indicates that the column is updated; thus, step 604 is performed to use the actual new value of the "comm" column, 95, for propagation.

Determining whether to use a null or the actual old value of each field is performed starting at step 606. If the column is a primary key column (step 606), then the actual old value is always used (step 614), because primary key columns are used to uniquely identify the row that is modified. In the example, the column "empno" is a primary key column, and, therefore, its value of 100 is sent. If, on the other hand, the column is not a primary key column, execution branches to step 608 to determine whether the column belongs to an updated column group. If the column does not belong to an updated column group, then execution proceeds to step 612 where a null value is used in place of the old value, since conflict detection will not be performed for that column group. In the example, the column "Jones" belongs to an unmodified column group, and, thus, a null value is to be transmitted in place of the string "Jones."

If, on the other hand, the column does belong to an updated column group, execution proceeds to step 610, where an administrative flag associated with the column, preferably part of the metadata for the table, is checked to determine whether conflict checking is explicitly disabled. If conflict checking is disabled, then the null value is used as the old value of the row (step 612). On the other hand, if conflict checking is enabled for the column, then execution branches to step 614, where the actual old value is used in propagation. In the example, conflict detection is enabled for all the columns. Since updated columns by definition belong to updated column groups, updated column "comm" belong to an updated column group; therefore, the actual old value for the column "comm" or 20 is sent. Column "bonus" belongs to a modified column group (because column "comm" was updated), and its actual old value of 0 is sent (step 614).

Modification information 418 therefore comprises actual old values for columns "empno," "comm," and "bonus" and a null as a placeholder for the propagated old value of column "ename." For the propagated new values, modification information 418 includes the actual new value for column "comm" and nulls for the columns "empno," "ename," and "bonus." For flags values in this example, the least significant bit indicates that the column was updated and, hence, an actual new value was sent, and the next least significant bit indicates that the actual old value was sent. Thus, the flag values for columns "empno," "ename," "comm," and "bonus" are binary 10, 00, 11, and 10, respectively. The bit pattern 01 (not shown) would indicate a modified column for which conflict detection was disabled, in which case a null as the old value and the actual new value would be propagated.

DETECTING FOR CONFLICTS AND UPDATING

Figure 7:
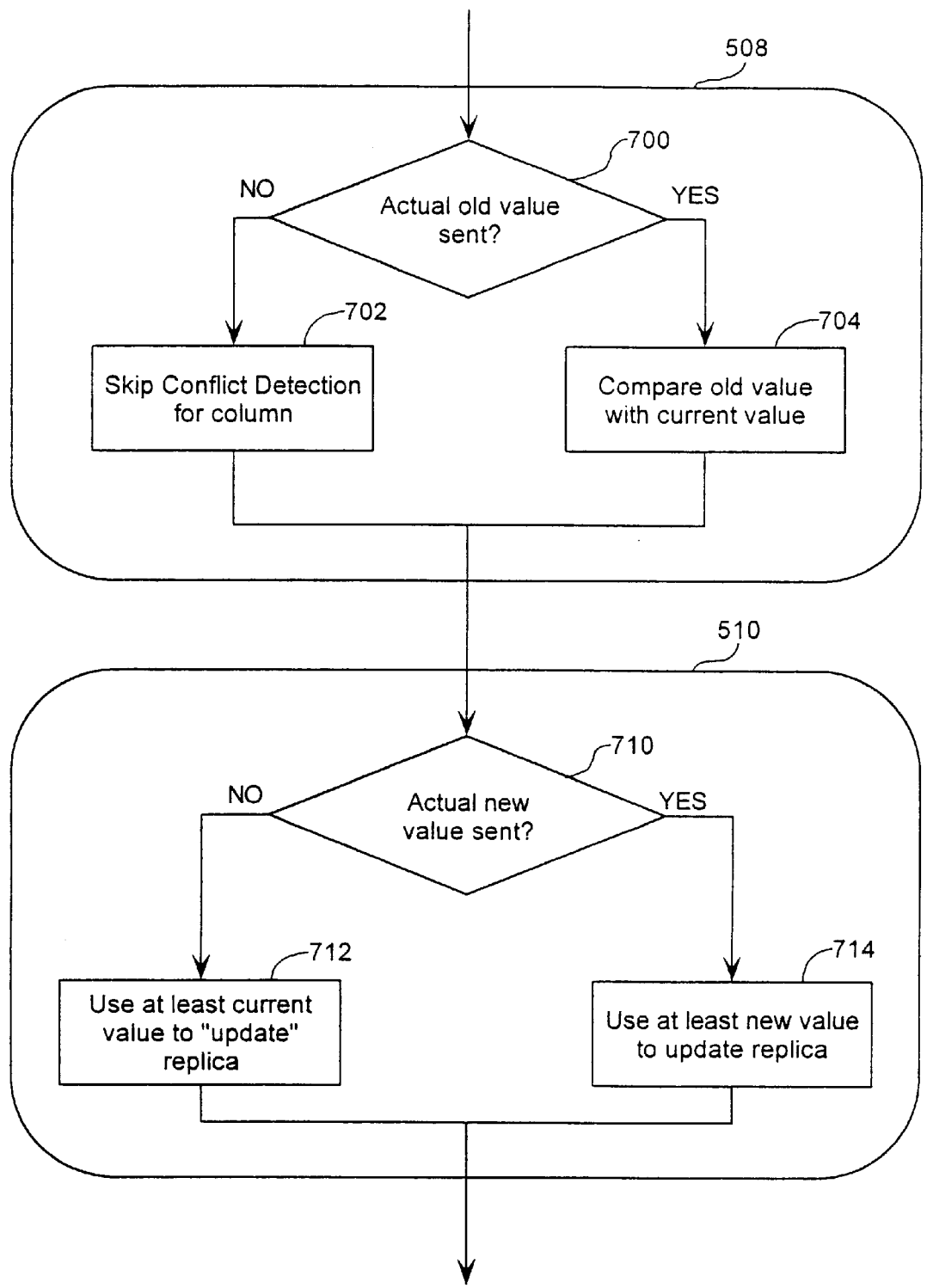
FIG. 7 is a flowchart showing the operations of detecting for conflicts and updating replicas according to one embodiment.

Referring back to FIGS. 4 and 5, the modification information is propagated to the destination site B 420 for the replication (step 506) via a replication mechanism 430, which can be a deferred transaction queue. In step 508, a conflict detection mechanism 432 at site B 420 receives the modification information 418 and detects for a conflict based the propagated old values and the current values for the row 428. With reference to FIG. 7, the destination conflict detection mechanism 432 checks whether the actual old value was sent (step 700), for example, by inspecting the old value sent flag or by deriving the information from the new value sent flags of several columns and metadata describing the column groups and primary key columns. If the actual old value was not sent, for example because the column was disabled or not in an updated column group, then conflict detection for the column is skipped (step 702). If, on the other hand, the actual old value was indeed sent, then the propagated old value and the current value are compared (step 704) to detect the conflict if not equal. In the example, a conflict is detected because the actual old value of 20 for column "comm" is not equal to the current value of 300 for column "comm" for the employee identified by the primary key "empno" of 100.

At step 510 in FIG. 5, the replica is updated based on information necessary for conflict resolution, depending on the conflict resolution technique being employed. The present invention is not limited to any particular conflict resolution technique, and may, in fact, be employed with a variety of conflict resolution techniques, which are described in detail in the commonly assigned U.S. application Ser. No. 08/618,607. Generally, conflict resolution techniques require use of at least the propagated new values, although some conflict resolution techniques also use the current values and the propagated old values.

Referring again to FIG. 7, the new value sent flag is checked or, alternatively, the propagated new value is checked for validity (step 710). If a small placeholder value or null was sent as the new value, then the current value and the old value are used to "update" the column (step 712) as appropriate for the conflict resolution technique being employed. On the other hand, if the actual new value was indeed sent then the new value is used to update the column in the row (step 714) in conjunction with the old value and the current value as appropriate. In the example, the new value of 95 for column "comm" and the current values of columns "empno," "ename," "comm," and "bonus" would be used to update the entire row, assuming the conflict resolution technique does not require the propagated old values.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of maintaining multiple copies of a body of data organized into records of related fields, said method comprising the computer-implemented steps of:

determining whether a record within said body of data is updated at a first site;

in response to determining that the record was updated, propagating, to a second site, small values in place of at least one of actual old values and actual new values associated with said related fields of said updated record; and determining whether a conflict exists within a corresponding record at said second site based on said propagated small values and said propagated actual old values; and if said conflict does not exist, then updating said corresponding record based on at least said propagated small values and said propagated actual new values.

2. The method of claim 1, wherein the step of propagating small values includes the step of propagating nulls.

3. The method of claim 1, wherein the step of propagating small values includes the step of propagating small values for new values associated with unmodified fields.

4. The method of claim 1, wherein the step of propagating small values includes the step of propagating small values for old values associated with fields in a linked collection of unmodified fields.

5. The method of claim 1, wherein the step of propagating small values includes the step of propagating small values for old values associated with fields having been disabled for conflict detection.

6. The method of claim 1, wherein the step of detecting for a conflict within a corresponding record based on said propagated small values and said propagated actual old values includes the step of detecting for a conflict only for fields of said corresponding record associated with said propagated old values.

7. The method of claim 1, wherein the step of updating said corresponding record based on at least said propagated small values and said propagated actual new values includes the step of updating fields in said corresponding record associated with said propagated new values and said propagated old values.

8. A method of maintaining multiple copies of a body of data organized into records of related fields, said method comprising the computer-implemented steps of:
   processing a request to perform an update to a record within a first copy of said body of data at a first site;
   identifying which of the related fields of said record are unmodified fields and which of the related fields of said record are updated fields; and
   propagating, to a second site storing a second copy of said body of data and capable of detecting conflicts therein, said update to said record by performing the steps of:
   (a) propagating to said second site values of at least one of said related fields, said values being prior to said processing, as old values for said at least one of said related fields,
   (b) propagating to said second site small values as new values for the unmodified fields, and
   (c) propagating to said second site values of the updated fields subsequent to said processing as new values for the updated fields.

9. The method of claim 8, wherein the step of identifying which of the related fields of said record are unmodified fields and which of the related fields of said record are updated fields includes the step of identifying which of the related fields of said record are unmodified fields and which of the related fields of said record are updated fields based on said request to update said record.

10. The method of claim 8, wherein the step of identifying which of the related fields of said record are unmodified fields and which of the related fields of said record are updated fields includes the step of identifying which of the related fields are unmodified fields and which of the related fields are updated fields based on said old values and said new values.

11. The method of claim 8, further comprising the step of:
   generating flag values for said fields, respectively, each of said flag values indicating whether or not a corresponding one of said fields is one of said updated fields;
   wherein the step of propagating, to said second site, said update to said record includes the step of propagating said flag values to said second site.

12. The method of claim 8, wherein the step of (a) propagating to said second site values of at least one of said related fields, said values being prior to said processing, as old values for said at least one of said related fields includes the step of propagating values to said second site of all of said related fields prior to said processing as old values of all of said related fields.

13. The method of claim 8, further comprising the step of partitioning said record into a plurality of groups of said fields;
   wherein the step of (a) propagating to said second site values of at least one of said related fields, said values being prior to said processing, as old values for said at least one of said related fields includes the steps of:
   propagating to said second site values of fields in a same group as updated fields, said values being prior to said processing, as old values for said fields in said same group as updated fields; and
   propagating to said second site small values of fields not in said same group as updated fields as old values for said fields not in said same group as updated fields.

14. The method of claim 8, further comprising the step of storing administrative flags for each of said fields;
   wherein the step of (a) propagating to said second site values of at least one of said related fields, said values being prior to said processing, as old values for said at least one of said related fields includes the step of propagating to said second site small values as old values for fields indicated by said administrative flags.

15. The method of claim 8, wherein the step of (a) propagating to said second site values of at least one of said related fields, said values being prior to said processing, as old values for said at least one of said related fields includes the step of propagating to said second site a value at least a gigabyte in size as an old value for one of said unmodified fields.

16. The method of claim 8, wherein the step of (b) propagating to said second site small values as new values for the unmodified fields includes the step of propagating to said second site null values as said new values for the unmodified fields.

17. The method of claim 8, wherein said body of data is organized into rows and columns.

18. A method of maintaining multiple copies of a body of data organized into records of related fields, said method comprising the computer-implemented steps of:
   partitioning said record into a plurality of groups of said fields;
   processing a request to perform an update to a record within a first copy of said body of data at a first site;
   identifying which of the groups are unmodified groups and which of the groups are updated groups, wherein all fields of an unmodified group are not modified and at least one field is an updated group is updated, and
   propagating, to a second site storing a second copy of said body of data and capable of detecting conflicts therein, said update to said record by performing the steps of:
   (a) propagating to said second site values of at least one field in an updated group, said values being prior to said processing, as old values for said at least one field in said updated group,
   (b) propagating to said second site small values as old values for fields in an unmodified group,
   (c) propagating to said second site values of one or more fields in an updated group, said values being subsequent to said processing as new values for said one or more fields in said updated group, and
   (d) propagating to said second site small values as new values for said fields in an unmodified group.

19. The method of claim 18, wherein the step of identifying which of the groups are unmodified groups and which of the groups are updated groups includes the step of identifying which of the groups are unmodified groups and which of the groups are updated groups based on said request to update said record.

20. The method of claim 18, wherein the step of identifying which of the groups are unmodified groups and which of the groups are updated groups includes the step of identifying which of the groups are unmodified groups and which of the groups are updated groups based on said old values and said new values.

21. The method of claim 18, further comprising the step of identifying which of the related fields of said record are unmodified fields and which of the related fields of said record are updated fields;
wherein the step of (c) propagating to said second site values of one or more fields in an updated group, said values being subsequent to said processing, as new values for said one or more fields in said updated group includes the steps of:
(c1) propagating to said second site small values as new values for unmodified fields of said one or more of said fields in said group as updated fields, and
(c2) propagating to said second site values of the updated fields of said one or more of said fields in said group as updated fields as new values for the updated fields of said one or more of said fields in said group as updated fields.

22. The method of claim 21, further comprising the step of:
generating flag values for said fields, respectively, each of said flag values indicating whether or not a corresponding one of said fields is one of said updated fields;
wherein the step of propagating, to said second site, said update to said record includes the step of propagating said flag values to said second site.

23. The method of claim 18, wherein the step of (c) propagating to said second site values of one or more fields in an updated group, said values being subsequent to said processing, as new values for said one or more fields in said updated group includes the step of propagating to said second site said values of all said fields in said updated group as new values for all said fields in said updated group.

24. The method of claim 18, further comprising the step of storing administrative flags for each said fields;
wherein the step of propagating, to a second site storing a second copy of said body of data, said update to said record includes the step of propagating to said second site small values as old values for fields indicated by said administrative flags.

25. The method of claim 18, wherein said small values comprise null values.

26. The method of claim 18, wherein said body of data is organized into rows and columns.

27. A computer-readable medium bearing instructions for maintaining multiple copies of a body of data organized into records of related fields, said instructions arranged to cause one or more processors to perform the steps of:
processing a request to perform an update to a record within a first copy of said body of data at a first site;
identifying which of the related fields of said record are unmodified fields and which of the related fields of said record are updated fields; and
propagating, to a second site storing a second copy of said body of data and capable of detecting conflicts therein, said update to said record by performing the steps of:
(a) propagating to said second site values of at least one of said related fields, said values being prior to said processing as old values for said at least one of said related fields,
(b) propagating to said second site small values as new values for the unmodified fields, and
(c) propagating to said second site values of the updated fields subsequent to said processing as new values for the updated fields.

28. The computer-readable medium of claim 27, wherein the step of identifying which of the related fields of said record are unmodified fields and which of the related fields of said record are updated fields includes the step of identifying which of the related fields of said record are unmodified fields and which of the related fields of said record are updated fields based on said request to update said record.

29. The computer-readable medium of claim 27, wherein the step of identifying which of the related fields of said record are unmodified fields and which of the related fields of said record are updated fields includes the step of identifying which of the related fields are unmodified fields and which of the related fields are updated fields based on said old values and said new values.

30. The computer-readable medium of claim 27, wherein:
said instructions are further arranged to perform the step of generating flag values for said fields, respectively, each of said flag values indicating whether or not a corresponding one of said fields is one of said updated fields; and
the step of propagating, to said second site, said update to said record includes the step of propagating said flag values to said second site.

31. The computer-readable medium of claim 27, wherein the step of (a) propagating to said second site values of at least one of said related fields, said values being prior to said processing, as old values for said at least one of said related fields includes the step of propagating values to said second site of all of said related fields prior to said processing as old values of all of said related fields.

32. The computer-readable medium of claim 27, wherein:
said instructions are further arranged to perform the step of partitioning said record into a plurality of groups of said fields; and
the step of (a) propagating to said second site values of at least one of said related fields, said values being prior to said processing, as old values for said at least one of said related fields includes the steps of:
propagating to said second site values of fields in a same group as updated fields, said values being prior to said processing, as old values for said fields in said same group as updated fields; and
propagating to said second site small values of fields not in said same group as updated fields as old values for said fields not in said same group as updated fields.

33. The computer-readable medium of claim 27, wherein:
said instructions are further arranged to perform the step of storing administrative flags for each said fields; and
the step of (a) propagating to said second site values of at least one of said related fields, said values being prior to said processing, as old values for said at least one of said related fields includes the step of propagating to said second site small values as old values for fields indicated by said administrative flags.

34. The computer-readable medium of claim 27, wherein the step of (a) propagating to said second site values of at least one of said related fields, said values being prior to said processing, as old values for said at least one of said related fields includes the step of propagating to said second site a value at least a gigabyte in size as an old value for one of said unmodified fields.

35. The computer-readable medium of claim 27, wherein the step of (b) propagating to said second site small values as new values for the unmodified fields includes the step of propagating to said second site null values as said new values for the unmodified fields.

36. The computer-readable medium of claim 27, wherein said body of data is organized into rows and columns.

37. A computer-readable medium bearing instructions for maintaining multiple copies of a body of data organized into records of related fields, said instructions arranged for causing one or more processors to perform steps of:

partitioning said record into a plurality of groups of said fields;

processing a request to perform an update to a record within a first copy of said body of data at a first site;

identifying which of the groups are unmodified groups and which of the groups are updated groups, wherein all fields of an unmodified group are not modified and at least one field is an updated group is updated; and propagating, to a second site storing a second copy of said body of data and capable of detecting conflicts therein, said update to said record by performing the steps of:

(a) propagating to said second site values of at least one field in an updated group, said values being prior to said processing, as old values for said at least one field in said updated group, (b) propagating to said second site small values as old values for fields in an unmodified group, (c) propagating to said second site values of one or more fields in an updated group, said values being subsequent to said processing, as new values for said one or more fields in said updated group, and (d) propagating to said second site small values as new values for said fields in an unmodified group.

38. The computer-readable medium of claim 37, wherein the step of identifying which of the groups are unmodified groups and which of the groups are updated groups includes the step of identifying which of the groups are unmodified groups and which of the groups are updated groups based on said request to update said record.

39. The computer-readable medium of claim 37, wherein the step of identifying which of the groups are unmodified groups and which of the groups are updated groups includes the step of identifying which of the groups are unmodified groups and which of the groups are updated groups based on said old values and said new values.

40. The computer-readable medium of claim 37, wherein:

said instructions are further arranged for performing the step of identifying which of the related fields of said record are unmodified fields and which of the related fields of said record are updated fields; and the step of (c) propagating to said second site values of one or more fields in an updated group, said values being subsequent to said processing, as new values for said one or more fields in said updated group includes the steps of:

(c1) propagating to said second site small values as new values for unmodified fields of said one or more of said fields in said group as updated fields, and (c2) propagating to said second site values of the updated fields of said one or more of said fields in said group as updated fields as new values for the updated fields of said one or more of said fields in said group as updated fields.

41. The computer-readable medium of claim 40, wherein:

said instructions are further arranged for performing the step of generating flag values for said fields, respectively, each of said flag values indicating whether or not a corresponding one of said fields is one of said updated fields; and the step of propagating, to said second site, said update to said record includes the step of propagating said flag values to said second site.

42. The computer-readable medium of claim 37, wherein the step of (c) propagating to said second site values of one or more fields in an updated group, said values being subsequent to said processing, as new values for said one or more fields in said updated group includes the step of propagating to said second site said values of all said fields in said updated group as new values for all said fields in said updated group.

43. The computer-readable medium of claim 37, wherein:

said instructions are further arranged for performing the step of storing administrative flags for each said fields; and the step of propagating, to a second site storing a second copy of said body of data, said update to said record includes the step of propagating to said second site small values as old values for fields indicated by said administrative flags.

44. The computer-readable medium of claim 37, wherein said small values are null values.

45. The computer-readable medium of claim 37, wherein said body of data is organized into rows and columns.

* * * * *